United States Patent [19]

Morgan

[11] 3,997,191
[45] Dec. 14, 1976

[54] RETRACTABLE AUXILIARY SUPPORT FOR TRAILERS

[76] Inventor: W. F. Morgan, 4556 S. Thirteenth West, Salt Lake City, Utah 84107

[22] Filed: Sept. 11, 1975

[21] Appl. No.: 612,337

[52] U.S. Cl. .................... 280/763; 280/475; 280/767
[51] Int. Cl.² .............................................. B60S 9/04
[58] Field of Search ............ 280/150.5, 475, 414 R

[56] References Cited
UNITED STATES PATENTS

| | | | |
|---|---|---|---|
| 1,303,922 | 5/1919 | Land | 280/150.5 |
| 2,225,157 | 12/1940 | Court | 280/150.5 |
| 2,885,181 | 5/1959 | McCully | 280/150.5 |
| 3,348,860 | 10/1967 | Buckles | 280/414 R |
| 3,360,282 | 12/1967 | Dugan | 280/475 |
| 3,563,567 | 2/1971 | Harp | 280/475 X |

*Primary Examiner*—Robert R. Song
*Attorney, Agent, or Firm*—Trask & Britt

[57] ABSTRACT

A castor wheel, preferably of the swivel type is mounted at the distal end of a leg support which is in turn connected to pivot on an axle transverse and beneath the tongue of a trailer. Means are provided to connect a winch associated with the trailer tongue to the leg support opposite the castor. The application of force through the winch pulls the castor wheel downward beneath the trailer tongue, thereby adjusting the elevation of a hitch mechanism carried by the trailer tongue.

5 Claims, 3 Drawing Figures

RETRACTABLE AUXILIARY SUPPORT FOR TRAILERS

BACKGROUND OF THE INVENTION

1. Field

This invention pertains to auxiliary supports for trailers, and provides an improved such support for a trailer with a tongue and associated winch, such as is customarily used for the loading and transport of boats.

2. State of the Art

The use of trailers for launching, transporting and storing boats is widespread. It is necessary to connect and disconnect these trailers to and from towing vehicles under a variety of conditions. Under many conditions, a single individual, or inexpert individuals, are required to perform this task. The loads carried by such trailers are often very large. It is often impossible for even a number of individuals together to overcome the tongue weight for the purpose of bringing the hitch mechanism carried by the trailer tongue into alignment with a corresponding ball (or comparable device) mounted on the towing vehicle. Accordingly, auxiliary support systems which adjust the elevation of the trailer tongue and permit supported lateral movement of the trailer tongue to match the vehicle ball have come into use. A variety of such systems and devices are currently in use, and others have been suggested, but these all have certain inherent limitations and disadvantages, particularly as applied to older trailers which were not initially equipped with such equipment.

Most devices associated with boat trailers and the like involve retracting trailer tongue wheels through various mechanical systems associated with the auxiliary structure itself. Examples of patents which disclose such devices are U.S. Pat. Nos. 2,810,588; 2,863,670; 3,314,692; 3,348,861; and 3,791,676. Winch systems have been built into semitrailers to operate retractable legs, for example, as disclosed by U.S. Pat. Nos. 3,563,567 and 3,572,752.

In general, the mechanisms in use are too expensive for incorporation on boat trailers which have not been adapted by the manufacturer for trailer tongue adjustment. Moreover, most such systems require factory installation, and cannot readily be installed on an existing trailer by its owner. There thus remains a need for a simple, inexpensive, apparatus for installation on conventional boat trailers with heavy tongue weights so that the tongue elevation can be adjusted by individuals who are infirm or otherwise incapable of exerting the force required to lift the heavy tongue of a boat trailer.

SUMMARY OF THE INVENTION

The present invention provides a retractable auxiliary support system for trailers having a tongue and associated winch mechanism. Thus, the structure of this invention is simple and inexpensive and may be either included with new trailers under construction or added to existing trailers lacking auxiliary supports.

In general, the structure of this invention includes a castor wheel mounted on a base support plate at the end of a leg which is in turn pivotally mounted on a axle transverse and beneath the trailer tongue. The upper end of the leg is bifurcated to straddle the tongue, and is provided with a bail or other means of attachment for the line carried by the winch associated with the tongue. In this fashion, the winch may be connected to the bail and cranked to pivot the castor wheel downward beneath the tongue the desired degree, thereby lifting the tongue. The distal end of the tongue carries the hitch mechanism up or down depending upon the degree and direction of winching action applied. Winching the line onto the winch spool causes the tongue to raise, and releasing the winch spool to loosen the line permits the leg support to collapse toward the tongue, thereby lowering the hitch mechanism.

Although the auxiliary support of this invention may be constructed in a variety of ways and take many forms, preferable construction is of tubular stock, ideally of rectangular cross-section, connected by a bracket which attaches to the trailer tongue. Thus, parallel leg members straddle the tongue and are connected by a base plate which carries the castor. This structure is rugged and lends itself to the incorporation of check means to limit the degree of pivot of the castor wheel with respect to the tongue.

BRIEF DESCRIPTION OF THE DRAWINGS

In the drawings, which illustrate what is presently regarded as the best mode for carrying out the invention.

DESCRIPTION OF THE ILLUSTRATED EMBODIMENT

Figure 1:
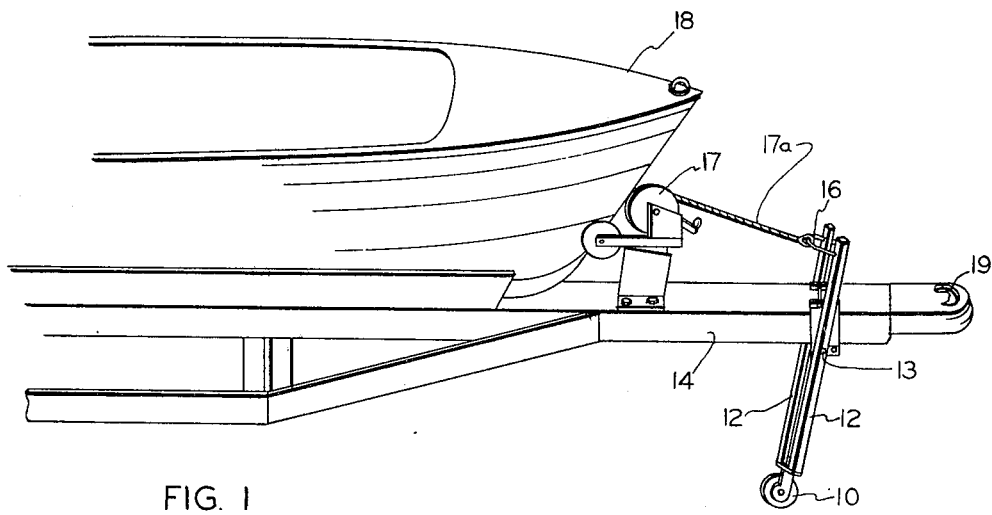
FIG. 1 is a fragmentary view in perspective of a conventional boat trailer with a boat loaded and the auxiliary support of this invention attached and winched up into supporting condition.
Figure 2:
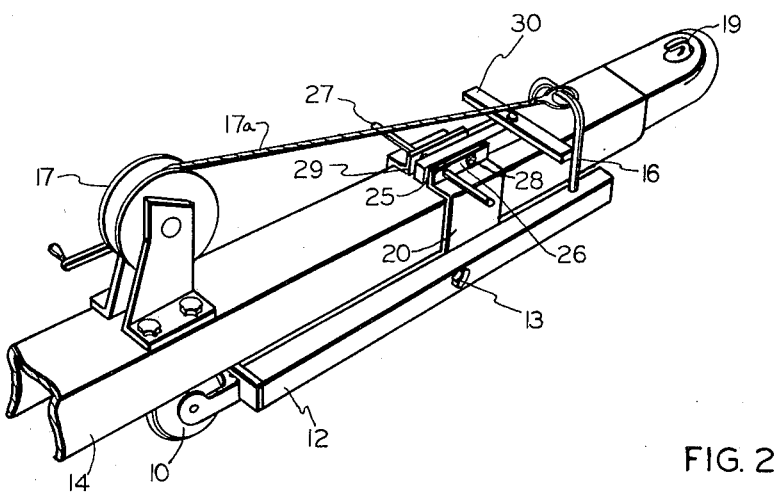
FIG. 2 is a fragmentary view of a portion of the structure shown by FIG. 1 and illustrating the invention in stored or collapsed condition.

In the embodiment of the invention illustrated, a castor wheel 10 is mounted to a plate 11 connecting two structural members 12. The members 12 are pivotally mounted to an axle 13 which, when the invention is installed as shown in FIGS. 1 and 2, runs transverse and below the tongue 14 of a boat trailer. FIG. 1 shows the wheel 10 drawn into a lowered position by operation of a winch 17 which normally is used to load a boat 18 onto the trailer. The forward ends of the members 12 are connected by a U-bolt 16 which serves both to check the degree of pivot of the members around the axle 13 and as an attachment point for the line 17a from the winch 17. The elevation of the hitch mechanism 19 carried at the distal end of the trailer tongue 14 is adjusted by the degree of pivot of the members 12 around the axle 13 as shown in FIG. 1.

The axle 13 illustrated is a bolt, preferably a hardened steel bolt, extending through the spaced parallel side members 12 and a straddled bracket 20 which is in turn clamped to the tongue 14. Various means may be provided to prevent the members 12 from pivoting too far, that is beyond the point where maximum elevation of the hitch is achieved and the castor wheel 10 is caused to move forward thereby collapsing the tongue. For example, a cross-bolt may be provided between the members 12 and beneath the axle 13 to check further travel of the members in the counterclockwise direction as viewed in the drawings.

The illustrated embodiment has application generally to any trailer having a tongue 14 and carrying a hitch mechanism 19 at its distal end with a winch 17 mounted remote from the hitch. In practice, this invention mounts an axle 13 transverse and below the tongue 14 between the hitch 19 and winch 17. As shown, a pair of leg extensions 12 is pivotally mounted on the axle 13 in straddling relationship with the tongue 14 to selectively swing between a stored position, in approximately parallel alignment with and beneath the tongue 14 as shown in FIG. 2, and various supporting positions intermediate between the illustrated stored position and a position in which the leg extensions 12 may be brought approximately vertical or approximately normal to the tongue 14. In this position, the hitch 19 is raised to its maximum elevation with respect to the wheel 10. No purpose is served by pivoting the leg extensions beyond this vertical position, and it is thus normally desirable to provide a stop means to prevent further pivoting. Moreover, with the members 12 slanted slightly back as shown, releasing the winch 17 to loosen the line 17a effects an automatic lowering of the hitch 19 due to pivoting back of the members 12 to take up the slack of the line 17a.

Figure 3:
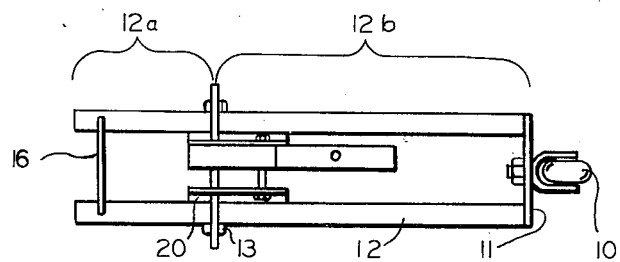
FIG. 3 is a top plan view of the apparatus of this invention showing its component parts.

Each of the leg extensions 12 has a first segment 12a extending from the axle toward the hitch 19 in stored position (FIG. 2) and above the tongue in all practical supporting positions (FIG. 1). Of course, it is recognized that some minor pivoting of the leg extensions 12 can occur before the segments 12a are brought above the tongue 14 but there is little, if any, useful purpose served by the wheel 10 at such positions. In addition, each of the leg extensions 12 includes a second segment 12b extending from the axle toward the winch in stored condition and below the tongue 14 in all supporting positions. A support structure such as the illustrated plate 11 is carried by the second segments 12b. It is recognized that in many embodiments the segment 12b might be very short and the supporting structure 11 would comprise the remainder of the length of the segment illustrated because the bifurcated portion of the leg element structure illustrated in FIG. 3 need not extend beyond the axle 13 to permit the degree of pivoting required by this invention. A castor wheel, desirably of the swivel type, 10 is carried by the support structure and a connection member, such as the U-bolt 16 illustrated, is carried by the opposite ends of the first segments 12a. The U-bolt shown brackets the tongue 14 and provides a means for pulling on the first segments 12a lifting them up past the tongue to cause the leg extensions 12 to pivot on the axle 13 thereby carrying the wheel down a selected (and infinitely variable) distance below the tongue.

FIG. 2 illustrates a preferred means for locking the leg extensions 12 in approximately vertical position and to stop further pivoting around the axle 13. A cross bolt 25 of threaded stock extends through the top flanges 26 of the clamp 20. The protruding ends 27 of this cross bolt 25 serve both as handles and as stop means to check further pivoting of the leg extensions 12. Cross bolt 25 and a second bolt 28 secure the flanges 26 tightly to the tongue 14 as shown. In addition, they support a bar 29 in slideable relationship between the flanges 26. A second bar 30 is pivotally carried at the forward end of the sliding bar 29. With the leg extensions 12 fully vertical, the bar 30 may be pivoted across their forward edges, thereby holding the extensions 12 vertical, even when the winch line 17a is disconnected. The sliding bar 29 facilitates "buttonholing" the pivoting bar 30 between the legs and into cross locked position. The threads of the cross bolt 25 serve to hold the sliding bar 29 in position when weight is translated to the bar 30.

It is desirable to provide a means for holding the leg extensions in stored position to prevent accidental dislodgement of the wheel 10 during transport. These means may, for example, constitute a strap fastened to the tongue and extending around the leg extensions 12 in stored position or a T-bar lock extending between the legs 12 to function as a rest in transit.

Although the invention has been described with particular reference to certain illustrated embodiments, it is not intended thereby to restrict the scope of the claims which themselves recite those features regarded as essential to the invention.

I claim:

1. A retractable auxiliary support for a trailer having a tongue and associated winch means, comprising:
    a leg support member with a first bifurcated end adapted to straddle the trailer tongue and a second end carrying a base support member;
    a castor wheel mounted to said base support member;
    a mounting bracket connected to said leg support member by an axle extending through said bifurcated first end so that said leg support is adapted to pivot around said bracket, the bracket constituting means for attaching the axle transverse and beneath the trailer tongue; and
    means for connecting said bifurcated end to said winch associated with said trailer tongue.

2. In a trailer with a tongue carrying a hitch mechanism at its terminal end and a winch mounted remote from the hitch mechanism, an auxiliary support system comprising:
    an axle supported transverse and beneath said tongue between said hitch and said winch;
    a pair of leg extensions pivotally mounted on said axle in straddling relationship with said tongue to selectively swing between a stored position in approximately parallel alignment with and beneath said tongue and various supporting positions intermediate between said stored position and a position approximately normal said tongue, said leg extensions each having:
        a first segment extending from said axle toward the hitch in stored position and above the tongue in all supporting positions; and
        a second segment extending from said axle toward said winch in stored condition and below said tongue in all supporting positions;
    support structure carried by said second segments;
    a castor wheel carried by said support structure; and
    a connection member attached to said first segments and releasably attachable to said winch constituting means for pulling said first segments up past said tongue, thereby causing said leg extensions to pivot on said axle to carry said wheel down a selected distance below said tongue.

3. A support system according to claim 2 wherein said connection member is a U-bolt with opposite legs connected to said first segments so that said U-bolt straddles said tongue from the top in collapsed position.

4. A support system according to claim 2 including stop means to prevent pivoting of said leg extensions substantially beyond a position normal the tongue.

5. A support system according to claim 2 including means for fastening said leg extensions in stored position.

* * * * *